United States Patent [19]
Venkataraman et al.

[11] Patent Number: 5,371,669
[45] Date of Patent: Dec. 6, 1994

[54] SLIDING MODE CONTROL METHOD HAVING TERMINAL CONVERGENCE IN FINITE TIME

[75] Inventors: Subramanian T. Venkataraman, Cerritos; Sandeep Gulati, Alhambra, both of Calif.

[73] Assignee: The United States of America as represented by the Administrator of the National Aeronautics and Space Administration, Washington, D.C.

[21] Appl. No.: 921,192

[22] Filed: Jun. 18, 1992

[51] Int. Cl.$^5$ .................................... G05B 13/02
[52] U.S. Cl. ................... 364/160; 364/148; 395/96
[58] Field of Search ............... 364/148, 158, 150, 165, 364/157, 160; 318/561, 508.1; 395/95, 96; 901/9, 15, 45

[56] References Cited

U.S. PATENT DOCUMENTS

| | | | |
|---|---|---|---|
| 4,498,036 | 2/1985 | Salemka | 318/561 |
| 4,710,865 | 12/1987 | Higomura . | |
| 4,725,942 | 2/1988 | Osuka | 364/150 |
| 4,728,872 | 3/1988 | Kishi et al. . | |
| 4,821,207 | 4/1989 | Ming et al. . | |
| 4,860,215 | 8/1989 | Seraji | 364/165 |
| 4,872,104 | 10/1989 | Holsinger | 364/166 |
| 4,918,584 | 4/1990 | Goff | 364/165 |
| 4,968,923 | 11/1990 | Busujima | 318/561 |
| 5,070,287 | 12/1991 | Boehm | 318/615 |
| 5,091,684 | 2/1992 | Iwashita | 318/615 |
| 5,216,342 | 6/1993 | Torii et al. | 318/561 |

OTHER PUBLICATIONS

M. Zak, "Cumulative effect at the soil surface due to shear wave propagation," ASME Journal of Applied Mechanics, vol. 50, 1983, pp. 227–229.

(List continued on next page.)

Primary Examiner—Roy N. Envall, Jr.
Assistant Examiner—Steven R. Garland
Attorney, Agent, or Firm—John H. Kusmiss; Thomas H. Jones; Guy M. Miller

[57] ABSTRACT

Nonlinear control method is provided for a closed-loop trajectory in a control system of the form $x=f(x)+u$ through a sliding surface, s, chosen such that $s=e+\lambda e=$, where e is the trajectory, and $\lambda$ is a positive constant using a control law of the form $$u = \ddot{x}_d - \alpha \frac{\beta_n}{\beta_d} e^{\frac{\beta_n}{\beta_d} - 1} \dot{e} - f(x)$$

which exploits terminal attractors of the form $$\dot{x} = \alpha x \frac{\beta_n}{\beta_d},$$

where $\alpha$ is a constant greater than zero, $\beta_n$, $\beta_d = (2i+1)$, where i belongs to the set of positive integers chosen for $\beta_n$ and $\beta_d$, and $\beta_d > \beta_n$ for convergence in finite time. For a system in which an initial $S_i$ is zero, a control law is used of the form $$u = \ddot{x}_d - \alpha \frac{\beta_n}{\beta_d} e^{\frac{\beta_n}{\beta_d} - 1} \dot{e} - \gamma s^{\frac{\delta_n}{\delta_d}} - f(x),$$

which yields a control equation $$p = \dot{s} + \gamma s^{\frac{\delta_n}{\delta_d}} = 0$$

where $\delta_n$, $\delta_d = (2i+1)$, wherein i belongs to the set of positive integers chosen for $\delta_n$ and $\delta_d$, and $\delta_d > \delta_n$ for retaining convergence in finite time.

5 Claims, 3 Drawing Sheets

OTHER PUBLICATIONS

S. T. Venkataraman and S. Gulati, "Terminal Sliding Modes: A New Approach to Nonlinear Control Synthesis," Fifth International Conference on Advanced Robotics, Pisa, Italy, vol. 1, pp. 443–448, Jun. 19–22, 1992.

J. T. Wen and D. S. Bayard, "New class of control for robotic manipulators, Part 1. Non-adaptive case," International Journal of Control, vol. 47, No. 5, 1988, pp. 1361–1406.

H. Asada and J. E. Slotine, Robot Analysis and Control, John Wiley and Sons, New York, New York, 1986 pp. 139–162.

N. Hogan, "Impedance Control: An Approach to Manipulation: Part II—Implementation, Part III—Applications," Journal of Dynamic Systems, Measurement and Control, 1985, pp. 8–24.

J. J. Slotine and W. Li, "Adaptive Manipulator Control: A Case Study," IEEE Trans. on Automatic Control, vol. 33, No. 11, Nov. 1988, pp. 995–1003.

SLIDING MODE CONTROL METHOD HAVING TERMINAL CONVERGENCE IN FINITE TIME

ORIGIN OF INVENTION

The invention described herein was made in the performance of work under a NASA contract, and is subject to the provisions of Public Law 96-517 (35 USC 202) in which the contractor has elected not to retain title.

TECHNICAL FIELD

The invention relates to robotic trajectory control in the presence of high frequency unmodeled dynamics enhancing the control performance of sliding control described by H. Asada and J. E. Slotine, *Robot Analysis and Control*, John Wiley and Sons, New York, N.Y., 1986, pp. 139-162, by introducing terminal convergence, thus developing control laws based upon a new class of sliding modes referred to herein as terminal sliders.

BACKGROUND ART

Many future robot systems may be required to operate in environments that are highly unstructured with varying dynamical properties, and are active, i.e., possessing means of self-actuation. The development of control technologies for unpredictable environments is a critical first step in efforts to design autonomous robotic systems. Specifically, algorithms devised for such a purpose must exhibit (i) robustness to parametric uncertainties in dynamic models and (ii) the ability to adapt rapidly enough to parametric variations in order to insure operational performance. Although a significant volume of literature may be found on the problems of robust control and adaptive control, many issues pertinent to robust and adaptive control algorithms for large magnitude and high frequency parametric uncertainties remain unresolved.

While positive displacement (PD) control schemes with gravity compensation have been shown to be globally stable for setpoint control, they cannot guarantee stability in the presence of parametric uncertainties.

Proportion, integral and differential (PID) control with gravity compensation is globally stable for setpoint control, even in the presence of uncertainty, but the resulting closed loop system is rather sluggish. This could potentially generate large transient errors, causing tool and robot damage during contact operations. Compliance and stiffness control schemes guarantee local stability and function adequately in quasi-static contact situations with well characterized stationary environments.

Impedance control has been applied to a wide spectrum of contact applications. [N. Hogan, "Impedance control: An approach to manipulation: Part I—Theory, Part II—Implementation, Part III—Applications," *Journal of Dynamic Systems, Measurement and Control*, 1985, pp. 1-24] The implementations are, however, limited to static environments. A detailed stability analysis of impedance control is available in N. Hogan, "On the stability of manipulators performing contact tasks," *IEEE Journal of Robotics and Automation*, Vol. 4, No. 6, December 1988.

Many robust control schemes have been proposed and implemented for pure motion and compliant motion control of robots and have demonstrated the ability to stabilize closed loop behavior in the presence of bounded parametric uncertainties. In addition, recent progress in adaptive control has enabled on-line accommodation of unknown robot mass and inertial parameters and payloads. [J. J. Slotine, W. Li, "Adaptive manipulator control: A case study," *IEEE Transactions on Automatic Control*, Vol. 33, No. 11, November 1988, pp. 995-1003]

There are a number of applications in which the foregoing state-of-the-art control technologies would fall short of prescribed system performance. Consider two scenarios relevant to space applications: (1) robot-assisted extravehicular activity and (2) autonomous fresh sample acquisition during precursor science [S. T. Venkataraman, N. Marzwell, "Telerobots for robust space operations," (to appear) Proceedings SPACE 92, Denver, Colo., 1992].

In the first scenario, voice-activated robots would assist astronauts by fetching and returning tools, helping transport large and heavy payloads, etc. In the second scenario, robotic elements interact with soil and rock media to extract core samples for scientific analysis. Note, however, that in both scenarios, the environment dynamics is partially or completely unknown. In addition, since astronauts are active, i.e., capable of self-actuation, and environments are unpredictable, e.g., rocks could contain unknown crevices, shear planes and cracks, the rate at which the robot control law accommodates the uncertainties must be explicitly controllable. Thus, the robot control law needs to be adjusted according to the rate of change in the environment. The following table summarizes the environmental effects in the two problem areas.

| Application | Unmodeled Phenomena | Effect on Dynamics |
|---|---|---|
| Robotic Coring | Cracks in Rocks | Unstructured Dynamics |
| | Holes/Vesicles in Rocks | High Frequency Variations |
| | Pressure Variation in Regolith | High Amplitude Variations |
| Astronaut Assistant | Unpredictable Human Movements | Unstructured Muscular Dynamics |
| | Varying Muscle Stiffness | Unpredictable Muscular Actuation |

Further, in both of the above applications, the actual dynamic characteristics of the environments are highly nonlinear. For example, research in biomechanical systems [J. M. Winters, L. Stark, A-H. Seif-Naraghi, "An analysis of the sources of musculoskeletal system impedance," *Journal of Biomechanics*, Vol. 21, No. 12, 1988, pp. 1011-1025; J. M. Winters, L. Stark, "Estimated mechanical properties of synergistic muscles involved in movements of a variety of human joints," *Journal of Biomechanics*, Vol. 21, No. 12, 1988, pp. 1027-1041], has indicated that the linear spring, dashpot model used in equation (8) of A. V. Hill, "The heat of shortening and the dynamic constants of muscle," *Proceedings Royal Society*, Vol. 126B, pp. 136-195, would be inadequate.

Models consisting of exponential and higher order polynomial terms have been suggested for the viscoelastic properties of the muscles, and their contractile dynamics have been modeled using first-order ordinary differential equation [Winters and Stark, supra]. Further, the strong interdependences between a human neuronal impedance (input impedance of the human muscular structure), his mechanical impedance [Winters, Stark and Seif-Naraghi, supra], coupled with the variations caused by fatigue [M. Pousson, J. Van Hoecke, F. Goubel, "Changes in elastic characteristics of human muscle induced by eccentric exercise," *Journal of Biomechanics*, Vol. 23, No. 4, 1990, pp. 343–348] cause the environmental models to be nonautonomous.

Similarly, environmental characteristics of rocks and regolith are extremely complex. For example, the models suggested in D. S. Rowley, F. C. Appl, "Analysis of Surface Set Diamond Bit Performance," *Society of Petroleum Engineers Journal*, September 1969, pp. 301–310, for diamond coring suggests a nonlinear dependence of the normal thrust force on the rock hardness, characteristics of the diamond matrix, drill diameters and the drilling rate. In addition, the relationship is nonautonomous due to the effect of temperature on drill characteristics, diamond wear and chip removal.

State-of-the-art PD control cannot guarantee system stability during the above mentioned robotic tasks. The sluggishness in system response with PID control could result in tool damage during sampling tasks and cause excessive human fatigue during astronaut assistance. The effectiveness of conventional compliance and stiffness control methods during autonomous sampling and astronaut assistance operations would be extremely limited given the complex nonautonomous nature of environment dynamics.

A primary concern with sliding mode robust control approaches is the large switching gains required and the constant chattering around the sliding surface. During autonomous sampling, this typically causes excessive tool wear, sample degradation and actuator saturation. Control switching, even as a phenomenon, cannot be recommended for man-machine systems. Although chattering can be potentially eliminated by the use of interpolation manifolds [Asada, et al., supra, pp. 139–157], it is not recommended for applications referred to in the table above since their size cannot be determined accurately apriori.

The present invention focuses on two key control requirements, control convergence and control robustness. When perfect model information is available, the closed loop convergence must be controllable depending, of course, upon environmental characteristics. For example, during astronaut assistance, robotic tasks must be completed in some specified time interval. The latter property has been referred to as finite time control systems in the control literature.

The second issue pertains to the development of robust control laws that do not require high frequency control switches. With this motivation, a theoretical framework that allows terminal control convergence is developed, wherein the convergence time is finite and controllable. A terminal sliding mode robust control law is proposed to deal with model uncertainties. It is shown that the proposed method leads to greater guaranteed precision in all control cases discussed herein.

The concept of applying sliding modes to control emerged from earlier work on variable structure systems, notably the work of A. F. Fillipov, "Differential equations with discontinuous right-hand sides," *Annals Mathematical Society Transactions*, Vol. 42, 1964. In principle, it revolves around the choice of a control law that forces the closed loop system behavior to be identical to a sliding surface. Typically, the closed loop system dynamics represents controlled system error behavior. As a result, one can model closed loop behavior through an appropriate choice of sliding surfaces. If a sliding surface is chosen such that $s = \dot{e} + \lambda e = 0$, where e is the trajectory error and $\lambda$ is a positive constant chosen by designer, then exponential error convergence occurs. Consider, for example, the system $$\ddot{x} = f(x) + u \qquad (1)$$

where x is the system state, $f$ is a smooth function of x, and u is the control. A control law of the form $u = u_o = -f(x) + \ddot{x}_d - \lambda \dot{e}$ will result in $s=0$. If the initial condition, $s(t_o)$, is zero then the system converges exponentially. When $s(t_o) \neq 0$, a control switch of the form K Sgn(s)K>0 may be added to $u_o$, where K is a constant, and Sgn(s) is 1, 0, and −1 if s is greater than zero, equal to zero, or less than zero (i.e., negative), respectively, to force the system to converge towards the sliding surface. At $s=0$, the switch is deactivated, and the previous arguments apply. It can be shown that the system will reach the sliding surface in finite time [Asada, et al., supra].

In the presence of parametric uncertainties where only $\hat{f}(x)$, an estimate of $f(x)$, is available, control law takes the following form:

$$\begin{aligned} u &= \hat{u} - K\,Sgn(s) \\ &= -\hat{f} + \ddot{x}_d - \lambda \dot{e} - K\,Sgn(s) \end{aligned} \qquad (2)$$

which yields $\dot{s} = f(x) - \hat{f}(x) - K\,Sgn(s)$. By choosing $K > \|f(x) - \hat{f}(x)\|$, Lyapunov stability and convergence towards the sliding surface ,s, can be ensured. [Asada, et al., supra]. The closed loop system does not actually stay on the sliding surface, since at $s=0$, $\dot{s} \neq 0$ it chatters in the neighborhood of the sliding surface [Asada, et al., supra]. Conventional sliding mode control, therefore, guarantees exponential stability with full model information and asymptotic stability in the presence of uncertainties. The design of interpolation regions is typically performed off-line using bounds on uncertainty and the expected system response in the neighborhood of the sliding surface.

The concept of terminally sliding surfaces may be developed from first principles and applied to control synthesis for nonlinear systems. The performance thus obtained can be compared to those with the conventional sliding mode control. To enhance convergence properties of dynamical systems, the concept of terminal attractors was introduced in M. Zak, "Terminal attractors for content addressable memory in neural networks," *Physics Letters*, Vol. 133, pp. 218–222, 1988. Since then terminally sliding surfaces have demonstrated considerable success in neural learning [J. Bahren and S. Gulati, "Self-organizing neuromorphic architecture for manipulator inverse kinematics," *NATO ASI Series*, Ed. C. S. G. Lee, Vol. 44, 1990]. It has the basic form of a cubic parabola:

$$\dot{x} = -x^{\frac{1}{3}} \qquad (3)$$

with an equilibrium point at $x=0$. Integrating between $t_{initial}$ and $t_{equilibrium}$, $$(t_{equilibrium} - t_{initial}) = \frac{3}{2} x_i^{2/3} \qquad (4)$$

This implies that Equation (4) settles into equilibrium in finite time. For an additional discussion of terminal sliders in coping with variations in unstructured environments, see S. T. Venkataraman and S. Gulati, "Terminal Sliding Modes: A New Approach to Nonlinear Control Synthesis," *Fifth International Conference on Advanced Robotics*, Pisa, Italy, Vol. 1, pp. 443-448, Jun. 19-22, 1992, which by this reference is hereby made a part hereof. This property has also been applied for finite time control of distributed parameter systems. [S. Jayasuriya and A. R. Diaz, "Performance enhancement of distributed parameter systems by a class of nonlinear control," *Proceedings Conference on Decision and Control*, Los Angeles, Calif., December 1987, pp. 2125-2126]. The better convergence results from increased local stability. A detailed discussion on terminal attractor may be found in Zak, supra.

The most general form for a first-order terminal attractor would be $\dot{x}+X(x)=0$, where X is bounded for a bounded x $Sgn(X)=Sgn\ x$ and $$\frac{\partial X}{\partial x} \to \infty \text{ as } x \to 0.$$

Such systems are Lipschitzian in any error, $\epsilon$, neighborhood of the equilibrium point, but are non-Lipschitzian at the equilibrium point itself. An intuitive argument about the dynamic behavior of such systems is provided in M. Zak, "Cumulative effect at the soil surface due to shear wave propagation," *ASME Journal of Applied Mechanics*, Vol. 50, 1983, pp. 227-229. To analyze such systems using Lyapunov methods, postulate the following: Given a dynamical system of the following form $x+X(x)=0$, and a Lyaponov function candidate V(x), where V is bounded for founded x $\|V(x\neq 0)\|>0, \|V(x=0)\|=0$, if $$\dot{V}+g(V)=0 \qquad (5)$$

where g is a smooth function of V, such that V has the terminal attractor property described above, the dynamical system is terminally stable. For example, the system $$\dot{x} = -x^{\frac{1}{5}}$$

would be terminally stable since $$\dot{V} = x^{\frac{6}{5}}$$

implies $$V = -\frac{6}{5} V^{\frac{1}{3}}.$$

In this invention, terminal attractors of the form $$\dot{x} = \alpha x^{\frac{\beta_n}{\beta_d}}$$

are exploited, where $\alpha>0$ and $\beta_n,\beta_d=(2i+1)$, where i belongs to the set of selected positive integers I so that both $\beta_n$ and $\beta_d$ will always be equal to odd integers, and $\beta_d>\beta_n$. For example, if the set of integers for $\beta_n$ and $\beta_d$ are 1 and 2, $\beta_n$ will equal 3 and $\beta_d$ will equal 5. The notation $i\epsilon I$ is used throughout with the same meaning and effect.

FIG. 1 describes terminal attractors with various convergence rates. Curves 1 and 2 portray attractor behavior Galedon different initial conditions. Note that the dotted curve 1' is the conventional counterpart of curve 1. Curves 3 and 4 portray the effect of attractor gain $\alpha$.

STATEMENT OF THE INVENTION

An object of this invention is to provide robust nonlinear controllers for robotic operations in unstructured environments based upon a new class of closed loop sliding control methods, sometimes denoted terminal sliders, where the new class will enforce closed-loop control convergence to equilibrium in finite time. Improved performance results from the elimination of high frequency control switching previously employed [Asada, et al., supra] for robustness to parametric uncertainties. Improved performance also results from the dependence of terminal slider stability upon the rate of change of uncertainties over the sliding surface rather than the magnitude of the uncertainty itself for robust control. Terminal sliding mode control also yields improved convergence where convergence time is finite and is to be controlled. A further object is to apply terminal sliders to robot manipulator control and benchmark performance with the traditional computed torque control method and provide for design of control parameters.

These and other objects of the invention are achieved in a control system
$$\dot{x}=f(x)+u,$$

for example, where x is the system state and u is the control for a closed loop trajectory through a sliding surface, s, chosen such that $s=e+\lambda e=0$, where e is the trajectory error $(x-x_d)$, $x_d$ is the desired trajectory, and $\lambda$ is a positive constant. The invention uses a control law of the form $$u = \ddot{x}_d - \alpha \frac{\beta_n}{\beta_d} e^{\frac{\beta_n}{\beta_d}-1} e' - f(x)$$

which exploits terminal attractors of the form $$\dot{x} = \alpha x^{\frac{\beta_n}{\beta_d}},$$

where $\alpha$ is a constant greater than zero, and $\beta_n$, $\beta_d=(2i+1)$, where $i\epsilon I$ is as defined above, and $\beta_d>\beta_n$. In order for the initial condition $s_i$ to be always zero, the following control law is used:

$$u = \ddot{x}_d - \alpha \frac{\beta_n}{\beta_d} e^{\frac{\beta_n}{\beta_d}-1} e - \gamma s^{\frac{\delta_n}{\delta_d}} - \hat{f}(x)$$

where $\lambda$ is a number greater than zero selected by the control system designer. Substituting this equation for u in the system equation $x=f(x)+u$ yields a control equation for a surface p referred to as a dynamic terminal slider $$p = \dot{s} + \gamma s^{\frac{\delta_n}{\delta_d}} = 0$$

which convergence to a steady state s in finite time. These equations thus define a novel approach to a particular class of feedback controllers which avoid the need for high gain control switches to redesign slider parameters for each trajectory in order that the initial condition will always be zero.

To apply terminal sliders to control robots having rigid links, the dynamics of the robots may be expressed by $$H(x)\ddot{x} + C(\dot{x},x)\dot{x} + G(x) = \tau$$

where x denotes configuration variables of the robot and $H(x)$, $C(x,x)$ and $G(x)$ denote the inertia, the matrix, Coriolis matrix and gravitational matrix, respectively. For robust computed torque control, $$\tau = -H(x)(\ddot{x}_d + K_v \dot{e} + K_p e) + C(x,x)\dot{x} + G(x)$$

in the equation immediately above to yield a closed-loop control system of the form $\ddot{e} + K_v \dot{e} + K_p e = 0$. When $K_v$, $K_p$ and $H$ are positive and definite as they are for robot control synthesis, the closed-loop error system is exponentially stable at $\dot{e} = e = 0$, which implies successful tracking of arbitrary trajectories with computed torque control using a control law of the form $$\tau = -H(x)\left(\ddot{x}_d + \alpha \frac{\beta_n}{\beta_d} e^{\frac{\beta_n}{\beta_d} - 1} \dot{e} + \gamma (\dot{e} + \alpha e^{\frac{\beta_n}{\beta_d}})^{\frac{\delta_n}{\delta_d}}\right) + C(\dot{x},x)\dot{x} + G(x)$$

which would result in a terminally stable condition. When model information of the system to be controlled is not accurate, a dynamic slider control law is used with a derived estimate $\hat{f}(x)$ in the form $$u = \ddot{x}_d - \alpha \frac{\beta_n}{\beta_d} e^{\frac{\beta_n}{\beta_d} - 1} \dot{e} - \gamma s^{\frac{\delta_n}{\delta_d}} - \hat{f}(x)$$

When substituted for u in the control system equation above, the control law of the above equation yields a terminal slider equation of the form $$\dot{s} = -\gamma s^{\frac{\delta_n}{\delta_d}} + \Delta$$

where $\Delta = f(x) - \hat{f}(x)$.

The equilibrium point for the terminal slider equation is at $s = 0$ and $$s = \left(\frac{\Delta}{\gamma}\right)^{\frac{\delta_n}{\gamma_d}}$$

so that precision with terminal sliders becomes $$s_{eq} = \left(\frac{\Delta}{\gamma}\right)^{\frac{\delta_d}{\delta_n}}, \text{ and } e_{eq} = \left(\frac{\left(\frac{\Delta}{\gamma}\right)^{\frac{\delta_d}{\delta_n}}}{\alpha}\right)^{\frac{\beta_d}{\beta_n}}$$

When terminal sliders are utilized with the precision of $$s_{eq} = \left(\frac{\Delta}{\gamma}\right)^{\frac{\delta_d}{\delta_n}},$$

the guaranteed precision becomes $$e_{pt} = \left(\frac{\left(\frac{\Delta_{min}}{\gamma}\right)^{\frac{\delta_d}{\delta_n}}}{\alpha}\right)^{\frac{\beta_d}{\beta_n}}.$$

where $\alpha > 0$ and $\beta_n, \beta_d = (2i+1)$, where $i \in I$, and $\beta_d > \beta_n$.

Figure 1:
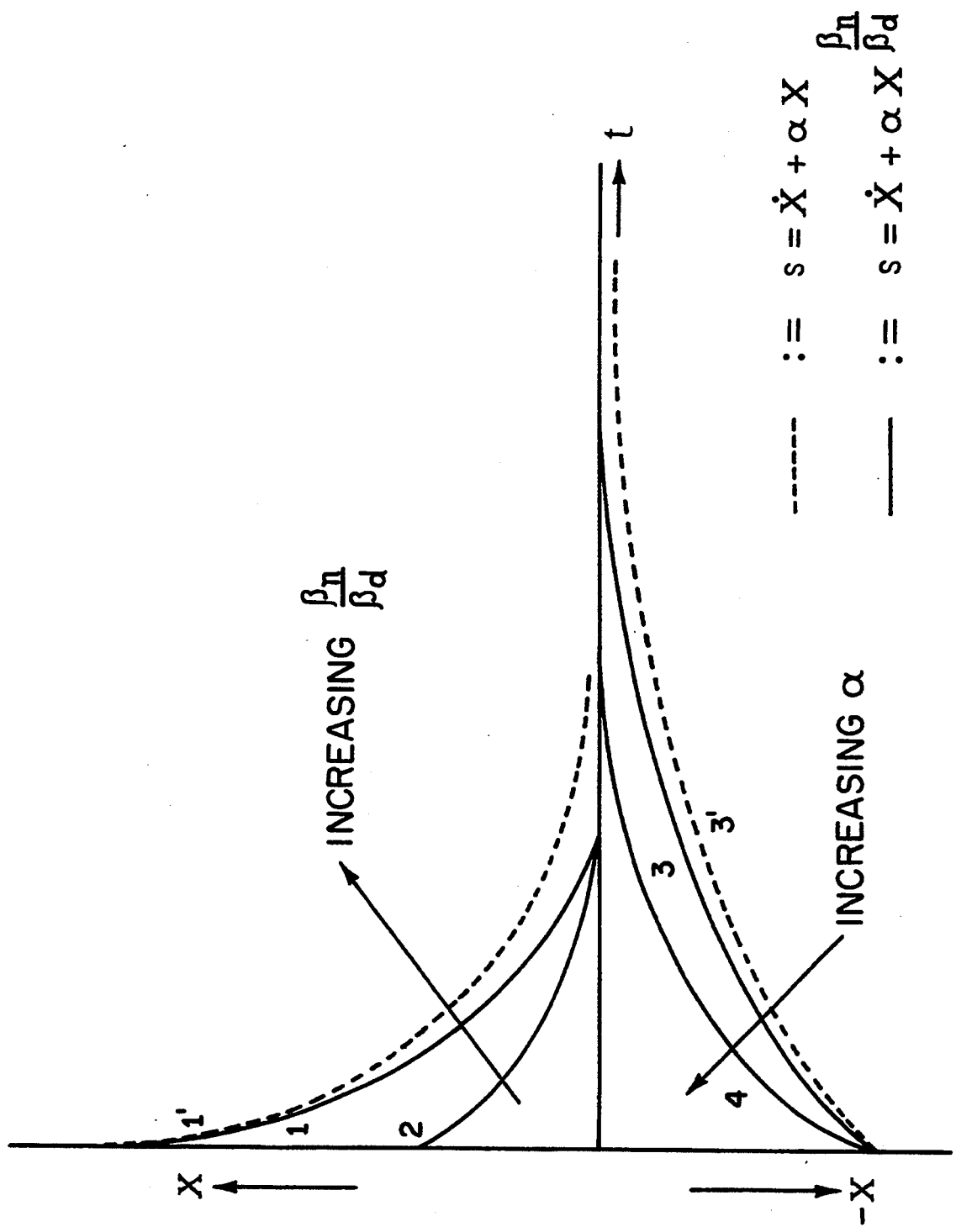
FIG. 1 is a graph which illustrates terminal attractors of the form $$\dot{x} = \alpha x^{\frac{\beta_n}{\beta_d}},$$
Figure 2:
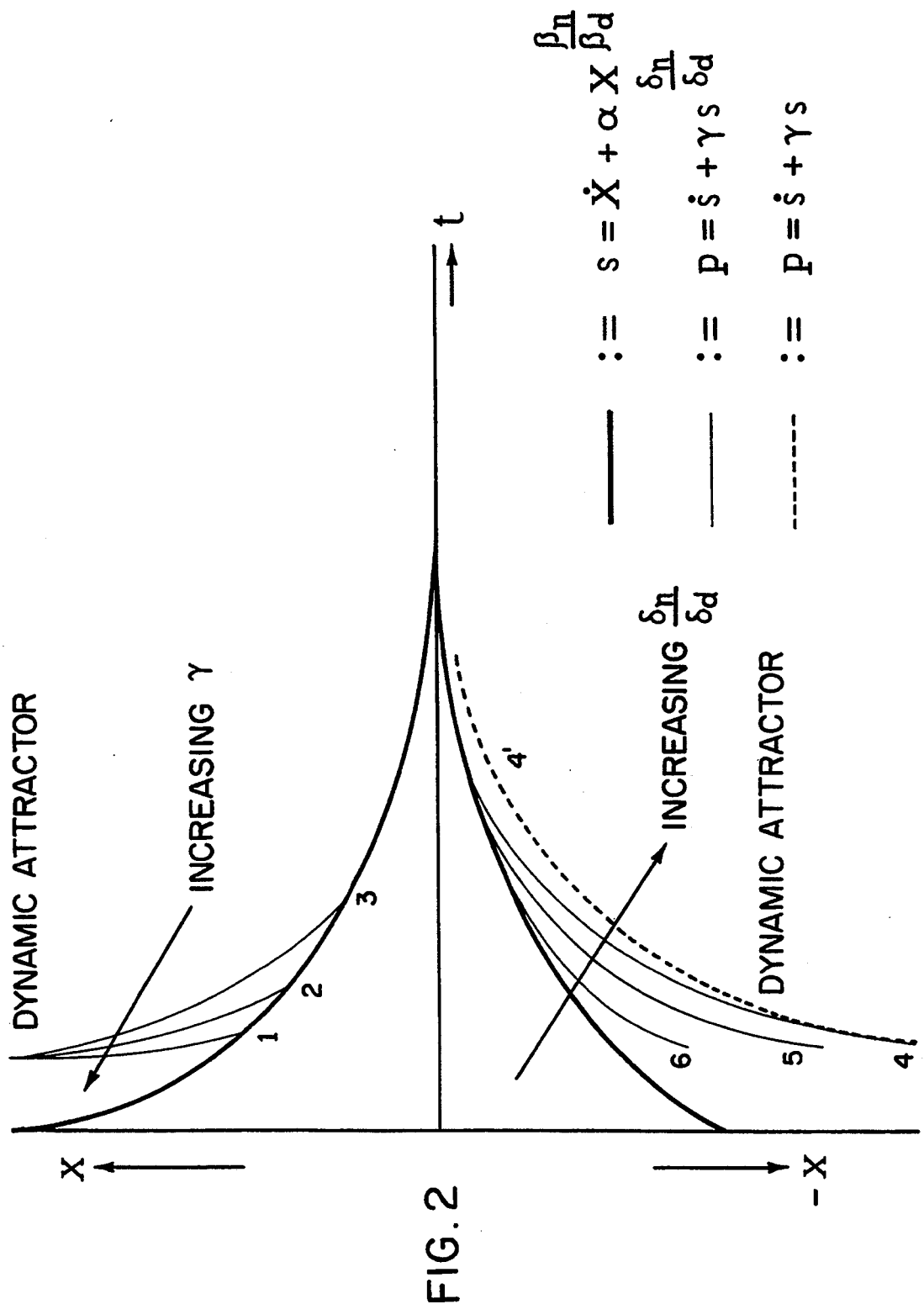

FIG. 2 is a graph which illustrates dynamic terminal behavior in accordance with the present invention.

Figure 3:
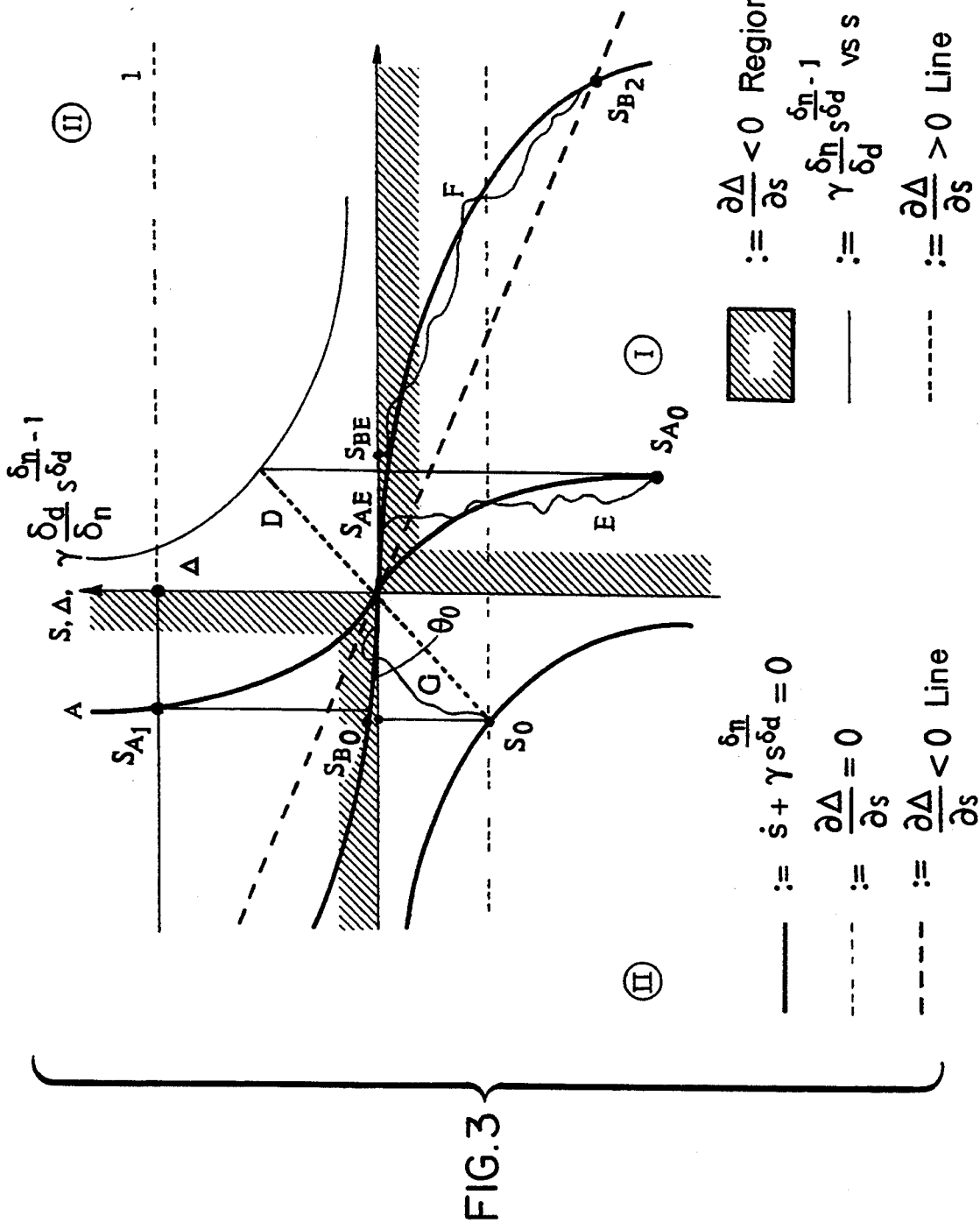

FIG. 3 is a graph that illustrates the properties of terminal sliders control of the present invention.

DETAILED DESCRIPTION OF THE INVENTION

The present invention utilizes the tools discussed above as background to develop a new class of closed loop sliding mode control methods or referred to hereinbefore as terminal sliders for a system, such as a robotic system having a distinctive characteristic of convergence to a stable state in finite time. Their performance is compared with the conventional sliding mode summarized above. The system in Equation (1) will be used as a running example. As before, error $e = (x - x_d)$, where $x_d$ is the desired trajectory. Consider a control law of the form $$u = \ddot{x}_d - \alpha \frac{\beta_n}{\beta_d} e^{\frac{\beta_n}{\beta_d} - 1} \dot{e} - f(x) \quad (6)$$

where $\alpha, \beta_n,$ and $\beta_d$ are defined as before. Substituting Equation (6) for u in the system Equation (1), the following closed loop system is derived:

$$\ddot{e} + \alpha \frac{\beta_n}{\beta_d} e^{\frac{\beta_n}{\beta_d} - 1} \dot{e} = 0. \quad (7)$$

For the above system design, a sliding surface exists such that $$s_i = \dot{e}_i + \alpha e_i^{\frac{\beta_n}{\beta_d}} = 0 \quad (8)$$

and the subscript i denotes initial conditions. Equation (8) and (7) together establish the terminal stability of the system in Equation (1) under the control law of Equation (6). Under such terminal stability, the surface s is denoted as a terminal sliding mode surface, and control laws similar to Equation (6) as closed loop sliding mode control method or as a terminal slider control method.

It is obvious that for feedback linearizing control with full model information, terminal slider control will outperform its conventional counterpart. Substituting for $\dot{e}$ in Equation (6) in terms of e, the following control law is developed:

$$u = \ddot{x}_d + \alpha^2 \frac{\beta_n}{\beta_d} e^{2\frac{\beta_n}{\beta_d} - 1} - f(x) \quad (9)$$

For the control signal u to be bounded, for a bounded error e, the exponent of e must be positive. This implies $$\frac{\beta_n}{\beta_d} > \frac{1}{2} \quad (10)$$

For the initial condition $s_i$ to be always zero, the slider parameters will require continuous redesign for each trajectory. In conventional sliders, this deficiency is overcome with a high gain switch that forces the system from any initial condition to the sliding surface [Asada, supra]. The present invention provides a new approach to the problem that models the behavior between initial condition and the sliding surface as a dynamical system. Consider the following control law $$u = \ddot{x}_d - \alpha \frac{\beta_n}{\beta_d} e^{\frac{\beta_n}{\beta_d} - 1} \dot{e} - \gamma s^{\frac{\delta_n}{\delta_d}} - f(x) \quad (11)$$

where $\lambda$ is a number greater than zero selected by the designer, and $\delta_n$, $\delta_d = (2i+1)$, where $i \in I$, and $\delta_d > \delta_n$. Substituting Equation (11) into Equation (1) yields $$p = \dot{s} + \gamma s^{\frac{\delta_n}{\delta_d}} = 0. \quad (12)$$

For any initial condition $s_i$, Equation (12) specifies convergence to the steady state of s in finite time, after which the system will reach $e=0$ on the surface s as before. The surface p in Equation (12) is referred to herein as a dynamic terminal slider. Note that a conventional slider counterpart of the form $s + \lambda s = 0$ would also provide the attraction from an arbitrary initial condition. However, the system would approach the sliding surface only exponentially. In contrast, by modeling the closed loop system in the form of a dynamic terminal slider, Equation (11) achieves finite time reaching of the slider surface from any arbitrary initial condition and without the application of any high gain switching.

To demonstrate Lyapunov stability for dynamic sliders, consider the Lyapunov function $$\ddot{V} = s^{2\frac{v_n}{v_d}},$$

where $v_n, v_d = (2i+1)$, $i \in I$, and $v_d > v_n$. Differentiating the Lyapunov function yields $$\dot{V} = -2 \frac{v_n}{v_d} \gamma s^{2\frac{v_n}{v_d} - 1} s^{\frac{\delta_n}{\delta_d}}.$$

Choosing $v_n$ and $v_d$ such that $$2\frac{v_n}{v_d}\left(1 - \frac{\eta_n}{\eta_d}\right) = \left(1 - \frac{\delta_n}{\delta_d}\right),$$

where $\eta_n, \eta_d = (2i+1), i \in I$, and $\eta_d > \eta_n$, terminal stability of dynamic sliders can be easily demonstrated $$\left(\text{e.g., } \frac{v_n}{v_d} = \frac{1}{3}, \frac{\eta_n}{\eta_d} = \frac{3}{5} \text{ and } \frac{\delta_n}{\delta_d} = \frac{11}{15}\right).$$

FIG. 2 displays the temporal behavior of dynamic terminal sliders. Curves labeled 1, 2, 3, 4, 5 and 6 are dynamic sliders converging to their respective terminal attractors (shown by thick lines). Curves 1, 2 and 3 show the effect of modulating the attractor gain, $\lambda$, while curves 4, 5 and 6 illustrate the effects of manipulating the exponent $$\frac{\gamma_n}{\gamma_d}.$$

Curves 4, 5 and 6 have different initial conditions but the same starting time.

In summary, a new approach applicable to a particular class of feedback linearizing controllers is presented by Equations (6) and (11). Superior closed loop system performance for arbitrary initial conditions has been demonstrated. In addition, the need for high gain control switches has been eliminated, thereby avoiding their detrimental effects during operation.

The following applies terminal sliders to control of robots having rigid links. In general, the dynamics of the robot may be expressed as $$H(x)\ddot{x} + C(\dot{x},x)\dot{x} + G(x) = \tau \quad (13)$$

where x denotes the configuration variables (joint angles, operational space coordinates, etc.) and H(x), C(x,x) and G(x) denote the inertia matrix, Coriolis matrix and the gravitational vector, respectively. It is well known that simple PD and PID control schemes [S. Arimoto and F. Miyazaki, "Stability and robustness of PID feedback control of robot manipulators of sensor capability," Proc. *International Symposium on Robotics Research*, MIT Press, Cambridge Mass., 1983] provide global asymptotic stability for setpoint control. J. T. Wen and D. S. Bayard, "New class of control for robotic manipulators, Part 1, Non-Adaptive Case," *International Journal of Control*, Vol. 47, No. 5, 1988, pp. 1361–1406, have discussed the extent of these control schemes. Computed torque schemes may, on the other hand, be applied for controlling robot trajectories [S. Arimoto, et al., supra]. Using these results as a baseline, we examine robust computed torque control, especially assuming to uncertainties in the gravitational and Coriolis terms.

Now consider the computed torque method for trajectory control. Given the robot dynamics in Equation (13), the conventional computed torque method utilizes the following control law:

$$\tau = -H(x)(\ddot{x}_d + K_v \dot{e} + K_p e) + C(\dot{x},x)\dot{x} + G(x). \quad (14)$$

Substituting this control law in Equation (13) yields a closed loop system of the form $\ddot{e} + K_v\dot{e} + K_p e = 0$. Assuming $K_p$, $K_v$ and $H$ to be positive and definite, the closed loop error system can be made exponentially stable at $\dot{e}=e=0$. This implies successful tracking of arbitrary trajectories using computed torque control schemes. Note that control laws that utilize $H(x_d)$, $C(\dot{x}_d, x_d)$ and $G(x_d)$ have also been suggested in the past [Arimoto, et al., supra]. A terminal slider counterpart would apply a control law of the form $$\tau = -H(x)\left(\ddot{x}_d + \alpha \frac{\beta_n}{\beta_d} e^{\frac{\beta_n}{\beta_d} - 1} \dot{e} + \gamma(\dot{e} + \alpha e^{\frac{\beta_n}{\beta_d}})^{\frac{\delta_n}{\delta_d}}\right) + C(\dot{x},x)\dot{x} + G(x). \quad (15)$$

This would result in $$\dot{s} + \gamma s^{\frac{\delta_n}{\delta_d}} = 0,$$

which is terminally stable.

When model information is not accurate, the issue of control robustness must be considered. Only additive uncertainties are considered in the following discussions, as opposed to multiplicative uncertainties (e.g., in robot inertias). Such effects are typically reflected in the system's control gains. For additional information, refer to Asada, et al., supra; Wen, et al., supra; and Slotine, et al., supra. In analyzing the example system of Equation (1) and extrapolating its results to control of robot manipulators with uncertainties in the coriolis and gravitational terms, consider the dynamic slider control law in Equation (11) with a derived estimate on $f(x)$ denoted by $\hat{f}(x)$ $$u = \ddot{x}_d - \alpha \frac{\beta_n}{\beta_d} e^{\frac{\beta_n}{\beta_d} - 1} \dot{e} - \gamma s^{\frac{\delta_n}{\delta_d}} - \hat{f}(x). \quad (16)$$

When substituted in Equation (1), the control law in Equation (16) yields a nonhomogeneous dynamic terminal slider equation of the form $$\dot{s} = -\gamma s^{\frac{\delta_n}{\delta_d}} + \Delta \quad (17)$$

where $\Delta = f(x) - \hat{f}(x)$. To analyze the stability properties of the closed loop system in Equation (17), consider a Lyapunov function $V$ of the form $$V = (\Delta - \gamma s^{\frac{\delta_n}{\delta_d}})^2 \frac{\eta_n}{\eta_d} \quad (18)$$

where $\eta_n, \eta_d$ are as defined previously, $\|V(\Delta,s)\| = 0$ and $$\Delta = \gamma s^{\frac{\delta_n}{\delta_d}},$$

and $\|V\| > 0$ everywhere else When $s$ is bounded, $\|V\|$ is bounded since $\Delta$, the uncertainty, is bounded. Differentiating Equation (18) results in the following:

$$\dot{V} = [(\Delta - \gamma s^{\frac{\delta_n}{\delta_d}})^2 \frac{\eta_n}{\eta_d} - 1]^T \left(\frac{\partial \Delta}{\partial t} - \frac{\gamma \delta_n}{\delta_d} s^{\frac{\delta_n}{\delta_d} - 1} \dot{s}\right), \quad (19)$$

where $T$ denotes a matrix transpose. An important observation that may be made is that if $\Delta$ is a time invariant constant, the closed loop system is terminally stable since $$\frac{\partial \Delta}{\partial t} = 0,$$

driving $$\dot{V} = -cV^{\frac{\nu_n}{\nu_d}}.$$

In the preceding expression $c > 0$, and both $\eta_n$ and $\eta_d$ are as defined previously.

The stability analysis when $$\frac{\partial \Delta}{\partial t} \neq 0,$$

may be performed as follows: It is well known that robots are passive systems, and that the terms I, C and G in Equation (13) are such that the joint velocities and transcendently functions involving joint positions are linearly separable form link lengths, masses and inertias. It is reasonable to assume that the model uncertainties arising from incorrect estimation of link lengths, link masses and link inertias would have a substantially larger effect than the uncertainties in the computation of transcendental functions. Consequently, $\Delta$ may be expressed using $$\Delta = (M - \hat{M})^T Y(X, \dot{X}) \quad (20)$$

where $Y$ is a matrix of joint velocities and transcendental functions of joint positions, M is denoted a vector of link masses, moments and inertias, while $\hat{M}$ is the estimated value of M. Let $\Delta_M$ denote $(M - \hat{M})^T$. The term $$\frac{\partial \Delta}{\partial t}$$

in Equation (19) may be expressed as $$\frac{\partial \Delta}{\partial t} = \Delta_M \left(\frac{\partial Y}{\partial x} \frac{\partial x}{\partial s} + \frac{\partial Y}{\partial \dot{x}} \frac{\partial \dot{x}}{\partial s}\right)\dot{s} \quad (21)$$

$$= \Delta_M \left(\frac{\partial Y}{\partial x} \frac{\beta_d}{\alpha \beta_n} e^{1 - \frac{\beta_n}{\beta_d}} + \frac{\partial Y}{\partial \dot{x}}\right)\dot{s}$$

$$\frac{\partial Y}{\partial x}, \frac{\partial Y}{\partial \dot{x}}$$

and $Y$ are bounded and the derivatives are known to be continuous. Since $\Delta_M$ in Equation (21) represents the effect of mass, moment and inertia it is bounded. Substituting Equation (21) in Equation (19) the following equation is derived:

$$\dot{V} = [(\Delta - \gamma s^{\frac{\delta_n}{\delta_d}})^2 \frac{\eta_n}{\eta_d} - 1]^T \left[\Delta_M \left(\frac{\partial Y}{\partial x} \frac{\beta_d}{\alpha \beta_n} e^{1 - \frac{\beta_n}{\beta_d}} + \frac{\partial Y}{\partial \dot{x}}\right) - \frac{\gamma \delta_n}{\delta_d} s^{\frac{\delta_n}{\delta_d} - 1}\right]\dot{s} \quad (22)$$

-continued $$= [(\Delta - \gamma s^{\frac{\delta n}{\delta d}})^2 \frac{\eta n}{\eta d}{}^{-1}]^T \left( \Delta_M \frac{\partial Y}{\partial s} - \frac{\gamma \delta_n}{\delta_d} s^{\frac{\delta n}{\delta d} - 1} \right) (\Delta - \gamma s^{\frac{\delta n}{\delta d}}),$$

where $$\frac{\partial Y}{\partial s} = \frac{\partial Y}{\partial x} \frac{\beta_d}{\alpha \beta_n} e^{1 - \frac{\beta n}{\beta d}} + \frac{\partial Y}{\partial \dot{x}}.$$

Note that Equation (21) implies that as the error reduces, $\partial Y/\partial s$ decreases since the term $\partial Y/\partial x$ is multiplied by a decaying error term. When $$\Delta_M \frac{\partial Y}{\partial s} - \frac{\gamma \delta_n}{\delta_d} s^{\frac{\delta n}{\delta d} - 1} < 0$$

in Equation (22), the closed loop system becomes terminally stable, since $$\dot{V} = -cV^{\frac{\eta n}{\eta d}}$$

where $c > 0$, and both $\eta_n$ and $\eta_d$ are as defined previously. When $$\left( \frac{\partial \Delta}{\partial s} - \frac{\gamma \delta_n}{\delta_d} s^{\frac{\delta n}{\delta d} - 1} \right) = 0,$$

the system is neutrally stable and remains without bounded error for bounded $$\frac{\partial \Delta}{\partial s}.$$

Next consider the design of parameters $\alpha$, $\beta n$, $\beta d$, $\delta$, $\lambda n$ and $\lambda d$ for terminally stable, closed loop system response using the expression $$\frac{\partial Y}{\partial s} = \frac{\partial Y}{\partial x} \frac{\beta_d}{\alpha \beta_n} e^{1 - \frac{\beta n}{\beta d}} + \frac{\partial Y}{\partial \dot{x}} \quad (23)$$

The first step is to choose the terminal exponent parameters $\beta_n$ and $\beta_d$. Subsequently, a choice of the terminal slider gain, $\alpha$, may be made using:

$$\alpha > \frac{\beta_d}{\beta_n} e^{1 - \frac{\beta n}{\beta d}} \quad (24)$$

Note that the norm of the error has not been used in Equation (24) since the exponent term removes the sign. Also, a strictly "greater than" has been used instead of $\geq$ since $1/\alpha$ must be bounded for all e. The second step is to choose appropriate values for $\delta_n$ and $\delta_d$. For terminal stability, $$\Delta_M \frac{\partial Y}{\partial s} - \frac{\gamma \delta_n}{\delta_d} s^{\frac{\delta n}{\delta d} - 1} < 0. \quad (25)$$

A choice of y that satisfied the condition in Equation (25) is $$\gamma > \left[ \| \Delta_M \| \left( \frac{\partial Y}{\partial x} + \frac{\partial Y}{\partial \dot{x}} \right) \| \right] \frac{\delta_d}{\delta_n} s^{1 - \frac{\delta n}{\delta d}}. \quad (26)$$

For robust control, the choice of $\lambda$ must be made using the bounds on values of various parameters, e.g., $$\gamma > \left[ \| \Delta_M \|_{max} \| \left( \frac{\partial Y}{\partial x} + \frac{\partial Y}{\partial \dot{x}} \right) \|_{max} \right] \frac{\delta_d}{\delta_n} s^{1 - \frac{\delta n}{\delta d}}. \quad (27)$$

The above condition insures terminally stable robust control of robots with prior knowledge on the bounds of uncertainty in link masses, moments, inertia, $$\frac{\partial Y}{\partial x} \text{ and } \frac{\partial Y}{\partial \dot{x}}.$$

The implications of the proposed terminal slider robust control law may be analyzed as follows. Since the stability properties of the system in Equation (17) depend on $$\frac{\partial \Delta}{\partial t},$$

the system is robust to configuration and/or velocity independent effects such as Coulomb friction. Secondly, the stability of the system depends upon the term $$\Delta_M \frac{\partial Y}{\partial s}$$

(denoted henceforth by $$\frac{\partial \Delta}{\partial s})$$

in Equation (22), rather than the magnitude of $\Delta$ itself, as in conventional sliders. This implies an accommodation of the controller to the first order dynamics of the uncertainty itself. Further, as the system converges, its ability to accommodate $$\frac{\partial \Delta}{\partial s}$$

increases. This is due to the fact that the stability properties of Equation (22) depend upon the magnitude of $$\frac{\gamma \delta_n}{\delta_d} s^{\frac{\delta n}{\delta d} - 1}.$$

For values of $$\| s \| < 1, s^{\frac{\delta n}{\delta d} - 1}$$

increases as $\|s\|$ decreases. Knowledge of the bounds on $$\frac{\partial Y}{\partial x} \text{ and } \frac{\partial Y}{\partial x}$$

can easily be obtained using kinematic information on degrees of freedom of the robot. Bounds on $\Delta_M$ may be evaluated based upon the degree of uncertainty in the estimation of respective parameters. Note that the equilibrium point (eq) for the system in Equation (17) is at $\dot{s}=0$ and $$s = \left(\frac{\Delta}{\gamma}\right)^{\frac{\delta_n}{\delta_d}}.$$

Therefore, the guaranteed precision with terminal sliders becomes $$s_{eq} = \left(\frac{\Delta}{\gamma}\right)^{\frac{\delta_d}{\delta_n}}, \tag{28}$$

and $$e_{eq} = \left(\frac{\left(\frac{\Delta}{\gamma}\right)^{\frac{\delta_d}{\delta_n}}}{\alpha}\right)^{\frac{\beta_d}{\beta_n}}. \tag{29}$$

Terminal slider control outperforms conventional sliders under all of the above mentioned conditions. Also, guaranteed precision is better with terminal sliders due to the following. In conventional sliding mode control [Asada, et al., supra], the interpolation region $\Phi$ is designed such that $$\dot{\Phi} + \alpha\Phi = \Delta \tag{30}$$

for some $\alpha > 0$. This implies that at steady state, $$\Phi_{eq} = \frac{\Delta_{eq}}{\alpha} \tag{31}$$

The best performance results from this system when the uncertainty is minimal at the closed loop systems equilibrium point. The best guaranteed precision is then given by $$e_{pc} = \frac{\Delta_{min}}{\alpha} \tag{32}$$

where the subscript pc denotes precision of conventional sliders, and $\Delta_{min}$ represents the minimal value of the uncertainty. If conventional sliders were applied in a dynamic sense (as with dynamic terminal sliders), such that $$p = \dot{s} + \lambda s = 0 \text{ where} \tag{33}$$

$$s = \dot{e} + \alpha e = 0 \tag{34}$$

then $e_{pc}$ would be equal to $$\frac{\Delta_{min}}{\alpha\gamma}.$$

This changed only by a factor of $\eta$. Conversely, when terminal sliders are utilized, from Equation (28), the guaranteed precision becomes $$e_{pt} = \left(\frac{\left(\frac{\Delta_{min}}{\gamma}\right)^{\frac{\delta_d}{\delta_n}}}{\alpha}\right)^{\frac{\beta_d}{\beta_n}} \tag{35}$$

where the subscript pt denotes precision of terminal sliders of the present invention. Equation (35) may be rewritten as $$e_{pt} = \alpha^{(\frac{\beta_d}{\beta_n} - \frac{\delta_d}{\delta_n})} \left(\left(\frac{\Delta}{\gamma\alpha}\right)^{\frac{\delta_d}{\delta_n}}\right)^{\frac{\beta_d}{\beta_n}} \tag{36}$$

Typically, $$\frac{\Delta_{min}}{\gamma\alpha} < 1,$$

and the exponents and $$\frac{\beta_d}{\beta_n} \text{ and } \frac{\delta_d}{\delta_n},$$

are greater than unity. Thus, $$\left(\left(\frac{\Delta}{\gamma\alpha}\right)^{\frac{\delta_d}{\delta_n}}\right)^{\frac{\beta_d}{\beta_n}} < e_{pc} \tag{37}$$

Further, choosing $$\alpha > 1 \frac{\beta_d}{\beta_n} > \frac{\delta_d}{\delta_n},$$

it can be insured that $e_{pt} < e_{pc}$, thereby suggesting that a greater guaranteed precision can always be maintained using terminal sliders, as compared to conventional sliders.

FIG. 3 illustrated the properties of robust terminal slider controls. Curves A and B show the phase space behavior of dynamic sliders ($\dot{s}$ vs s plots). With full model information, from any initial state ($S_{A1}$ Or $S_{B1}$) the system will converge along the respective terminal sliders to the origin of the graphs in FIG. 3. Note that uncertainty term $\Delta$ and the term $$\gamma \frac{\delta_d}{\delta_n} s^{\frac{\delta_n}{\delta_d} - 1}$$

have also been marked along the vertical axis. Constant $\Delta$'s are represented by the lines marked 1 and 2. When $\Delta$ is constant, the closed loop system is stable from any initial condition. For example, from an initial condition $S_{Ao}$ (marked by S and $\Delta$ coordinates), the system will converge to an equilibrium $S_{AE}$.

$$\frac{\partial \Delta}{\partial s} < 0$$

is represented by the regions in the figure marked at I. If the system remains in region I at all times, it will converge from any initial condition for all $\alpha, \lambda > 0$ and appropriate choice of terminal exponents. For example, if $$\frac{\partial \Delta}{\partial s}$$

is as shown by curve C, then from initial condition $S_{B2}$, the system will converge to some steady state $S_{BE}$. When $$\frac{\partial \Delta}{\partial s}$$

lies in the regions marked II, the parameters $\alpha$ and $\lambda$ must be designed for control robustness. Let the bound on $$\frac{\partial \Delta}{\partial s}$$

be denoted by the line D. Note that $$\theta_o = \text{Tan}\left[\frac{\partial \Delta}{\partial s}\right].$$

The terminal sliders parameters must be chosen such that the initial value of s must be less in magnitude than the value $S_{Bo}$, where $S_{Bo}$ is the projection of $S_O$ on the s axis and $S_O$ is the intersection between the $$\gamma \frac{\delta_d}{\delta_n} s^{\frac{\delta_n}{\delta_d} - 1}$$

versus s hyperbolic curve and the line marked D. For such a design, the closed loop behavior would resemble the curve marked G from $S_O$ to $S_E$. Note that as the value of s grows smaller for a constant value of $\gamma$, the system will be robust to increasing values of $$\frac{\partial \Delta}{\partial s},$$

i e., larger values of $\theta_o$.

In conclusion, greater performance with sliders has been made possible by this invention than has been available with the prior art cited, which by their reference herein are hereby made a part hereof.

We claim:

1. A closed-loop sliding mode control method for a system of the form $\dot{x} = f(x) + u$ with convergence to equilibrium, robustness to parametric uncertainties, and stability upon the rate of change of uncertainties over a sliding surface, where x is the system state and u is the control for a closed-loop trajectory through a sliding surface $s = \ddot{e} + \lambda e = 0$ where e is the trajectory error $(x - x_d)$, and $x_d$ is the desired trajectory, and $\lambda$ is a positive constant, by applying to said system a control of the form $$u = \ddot{x}_d - \alpha \frac{\beta_n}{\beta_d} \dot{e}^{\frac{\beta_n}{\beta_d} - 1} \dot{e} - f(x)$$

where $\alpha$ is a positive constant and $\beta_n$, $\beta_d$ are chosen parameters equal to $(2i+1)$ where i belongs to a set of positive integers chosen for $\beta_n$ and $\beta_d$ so that both of said parameters will be odd integers and $\beta_d > \beta_n$, whereby convergence to steady state is achieved in finite time.

2. A closed-loop sliding mode control method for a system of the form $\dot{x} = f(x) + u$ with convergence to equilibrium, robustness to parametric uncertainties, and stability upon the rate of change of uncertainties over a sliding surface, where x is the system state and u is the control for a closed-loop trajectory through a sliding surface $s = e + \lambda e = 0$ where e is the trajectory error $(x - x_d)$, and $x_d$ is the desired trajectory, and $\lambda$ is a positive constant, by applying to said system a control of the form $$u = \ddot{x}_d - \alpha \frac{\beta_n}{\beta_d} \dot{e}^{\frac{\beta_n}{\beta_d} - 1} e - \gamma s^{\frac{\delta_n}{\delta_d}} - f(x),$$

where $\alpha$ is a positive constant and $\beta_n$, $\beta_d$ are chosen parameters equal to $(2i+1)$ where i belongs to a set of positive integers chosen for $\beta_n$ and $\beta_d$ so that both of said parameters will be odd integers and $\beta_d > \beta_n$, which yields a control equation $$p = \dot{s} + \gamma s^{\frac{\delta_n}{\delta_d}} = 0$$

in which an initial state $s_i$ is to be always zero and where $\lambda$ is a chosen parameter, $\delta_n$, $\delta_d$ are chosen parameters equal to $(2i+1)$, and i belongs to a set of positive integers chosen for $\delta_n$ and $\delta_d$ so that both of said parameters will be odd integers and $\delta_d > \delta_n$, whereby convergence to a steady state is achieved in finite time.

3. A closed-loop sliding mode control method for a system of the form $\dot{x} = f(x) + u$ with convergence to equilibrium, robustness to parametric uncertainties, and stability upon the rate of change of uncertainties over a sliding surface, where x is the system state and u is the control for a closed-loop trajectory through a sliding surface $s = \dot{e} + \lambda e = 0$ where e is the trajectory error $(x - x_d)$, and $x_d$ is the desired trajectory, and $\lambda$ is a positive constant, when information about said systems is not accurate, thus requiring the use of a derived estimate $\hat{f}(x)$ for $f(x)$, by applying to said system a control in the form $$u = \ddot{x}_d - \alpha \frac{\beta_n}{\beta_d} \dot{e}^{\frac{\beta_n}{\beta_d} - 1} e - \gamma s^{\frac{\delta_n}{\delta_d}} - \hat{f}(x)$$

where $\alpha$ is a positive constant and $\beta_n$, $\beta_d$ are chosen parameters equal to $(2i+1)$ where i belongs to a set of positive integers chosen for $\beta_n$ and $\beta_d$ so that both of said parameters will be odd integers and $\beta_d > \beta_n$, which, when substituted in said control method of the aforesaid form $x = f(\hat{x}) + u$, yields a closed-loop sliding mode control method of the form $$\dot{s} = -\gamma s^{\frac{\delta_n}{\delta_d}} + \Delta,$$

in which an initial state $s_i$ is to be always zero, and where $\Delta = f(x) - \hat{f}(x)$ and which yields a control equation $$p = \dot{s} + \gamma s^{\frac{\delta_n}{\delta_d}} = 0$$

where $\lambda$ is a chosen parameter, $\delta_n$, $\delta_d$ are as before chosen parameters equal to $(2i+1)$ where i belongs to a set of positive integers chosen for $\delta_n$ and $\delta_d$ so that both of said parameters will be odd integers and $\delta_d > \delta_n$, whereby convergence to a steady state is achieved in finite time.

4. A closed-loop sliding mode control method for a system as defined in claim 3 wherein said system is a terminally stable, closed-loop robotic system having rigid links and joints, said control method being carried out by controlling said system in such a manner that $$\frac{\partial Y}{\partial s} = \frac{\partial Y}{\partial x} \frac{\beta_d}{\alpha \beta_n} e^{1-\frac{\beta_n}{\beta_d}} + \frac{\partial Y}{\partial \dot{x}},$$

where Y is a matrix of joint velocities and transcendental of joint positions, terminal exponent parameters $\beta_n$ and $\beta_d$ are first chosen, and then a terminal slider gain $\alpha$ is selected such that $$\alpha > \frac{\beta_d}{\beta_n} e^{1-\frac{\beta_n}{\beta_d}},$$

after which $\delta_n$ and $\delta_d$ are chosen for terminal stability that satisfies a condition $$\Delta_M \frac{\partial Y}{\partial s} - \frac{\gamma \delta_n}{\delta_d} s^{\frac{\delta_n}{\delta_d} - 1} < 0$$

where $\hat{M}$ denotes a vector of link masses, moments and inertias, M is the estimated value of M, and $\Delta_M = (M - \hat{M})^T$, where T denotes a matrix transpose, and Y is a motion of joint velocities and transcendental functions of joint positions of the robot links.

5. A closed-loop sliding mode control method for a system as defined in claim 4, said control method being constrained for robust control by imposing bounds on values of parameters thus $$\gamma > \left[ \|\Delta_M\|_{max} \| \left( \frac{\partial Y}{\partial x} + \frac{\partial Y}{\partial \dot{x}} \right) \|_{max} \right] \frac{\delta_d}{\delta_n} s^{1 - \frac{\delta_n}{\delta_d}}.$$

* * * * *